United States Patent
Mahfoudh et al.

(10) Patent No.: US 6,981,732 B2
(45) Date of Patent: Jan. 3, 2006

(54) DEVICE TO ACCOMMODATE A LATCHING ELEMENT ON A WIPER DRIVE

(75) Inventors: Samir Mahfoudh, Buehl (DE); Roland Bohn, Buehl (DE); Bernhard Patrix, Buehlertal (DE)

(73) Assignee: Robert Bosch GmbH, (DE)

( * ) Notice: Subject to any disclaimer, the term of this patent is extended or adjusted under 35 U.S.C. 154(b) by 0 days.

(21) Appl. No.: 10/476,956

(22) PCT Filed: Mar. 13, 2003

(86) PCT No.: PCT/DE03/00799

§ 371 (c)(1),
(2), (4) Date: Nov. 6, 2003

(87) PCT Pub. No.: WO2004/026647

PCT Pub. Date: Apr. 1, 2004

(65) Prior Publication Data

US 2004/0245802 A1  Dec. 9, 2004

(30) Foreign Application Priority Data

Sep. 12, 2002 (DE) ........................... 202 14 130 U

(51) Int. Cl.
    *B60J 1/20* (2006.01)

(52) U.S. Cl. .................... 296/96.15; 15/250.3

(58) Field of Classification Search ............. 296/96.15, 296/96.17; 292/144, 201, DIG. 23, DIG. 42, 292/43; 15/250.001, 25.03; 318/443, 444, 318/445, 466
See application file for complete search history.

(56) References Cited

U.S. PATENT DOCUMENTS

| | | | | |
|---|---|---|---|---|
| 5,694,812 A | * | 12/1997 | Maue et al. | 74/471 R |
| 5,722,108 A | * | 3/1998 | Sakyo et al. | 15/250.19 |
| 5,764,010 A | * | 6/1998 | Maue et al. | 318/443 |
| 5,841,249 A | * | 11/1998 | Zimmer et al. | 318/10 |
| 5,844,382 A | * | 12/1998 | Dan | 318/10 |
| 5,847,519 A | * | 12/1998 | Kilker | 318/14 |
| 5,903,114 A | * | 5/1999 | Miller et al. | 318/10 |
| 5,905,345 A | * | 5/1999 | Zimmer et al. | 318/4 |
| 5,907,199 A | * | 5/1999 | Miller | 310/12 |
| 5,907,885 A | * | 6/1999 | Tilli et al. | 15/250.16 |
| 5,916,327 A | * | 6/1999 | Maue et al. | 74/471 R |
| 5,924,324 A | * | 7/1999 | Kilker et al. | 74/89.18 |
| 5,949,206 A | * | 9/1999 | Oruganty et al. | 318/280 |
| 5,953,786 A | * | 9/1999 | Maue et al. | 15/250.01 |
| 5,969,431 A | * | 10/1999 | Miller et al. | 307/10.1 |
| 5,977,678 A | * | 11/1999 | Miller et al. | 310/103 |
| 5,979,255 A | * | 11/1999 | Huang et al. | 74/84 R |

(Continued)

FOREIGN PATENT DOCUMENTS

| | | |
|---|---|---|
| DE | 30 26 174 A | 2/1981 |
| DE | 100 06 412 A | 8/2000 |

*Primary Examiner*—H. Gutman
(74) *Attorney, Agent, or Firm*—Michael Best & Friedrich LLP

(57) ABSTRACT

The invention relates to a wiper drive with a wiper arm receptacle (2) for mounting on an articulated window surface (44). This window surface can be locked by means of a locking element (10). The wiper drive (1) includes a cover part (5), on which a wiper motor (14) and a gear (15) allocated to it are accommodated. A receptacle (9; 22, 23) for the locking element (10; 16, 17) is integrated into the cover part (5). A securing element (28), which is arranged between the surfaces (30, 31) of the receptacle (9; 22, 23), is accommodated on the locking element (10).

15 Claims, 6 Drawing Sheets

U.S. PATENT DOCUMENTS

Figure 1:
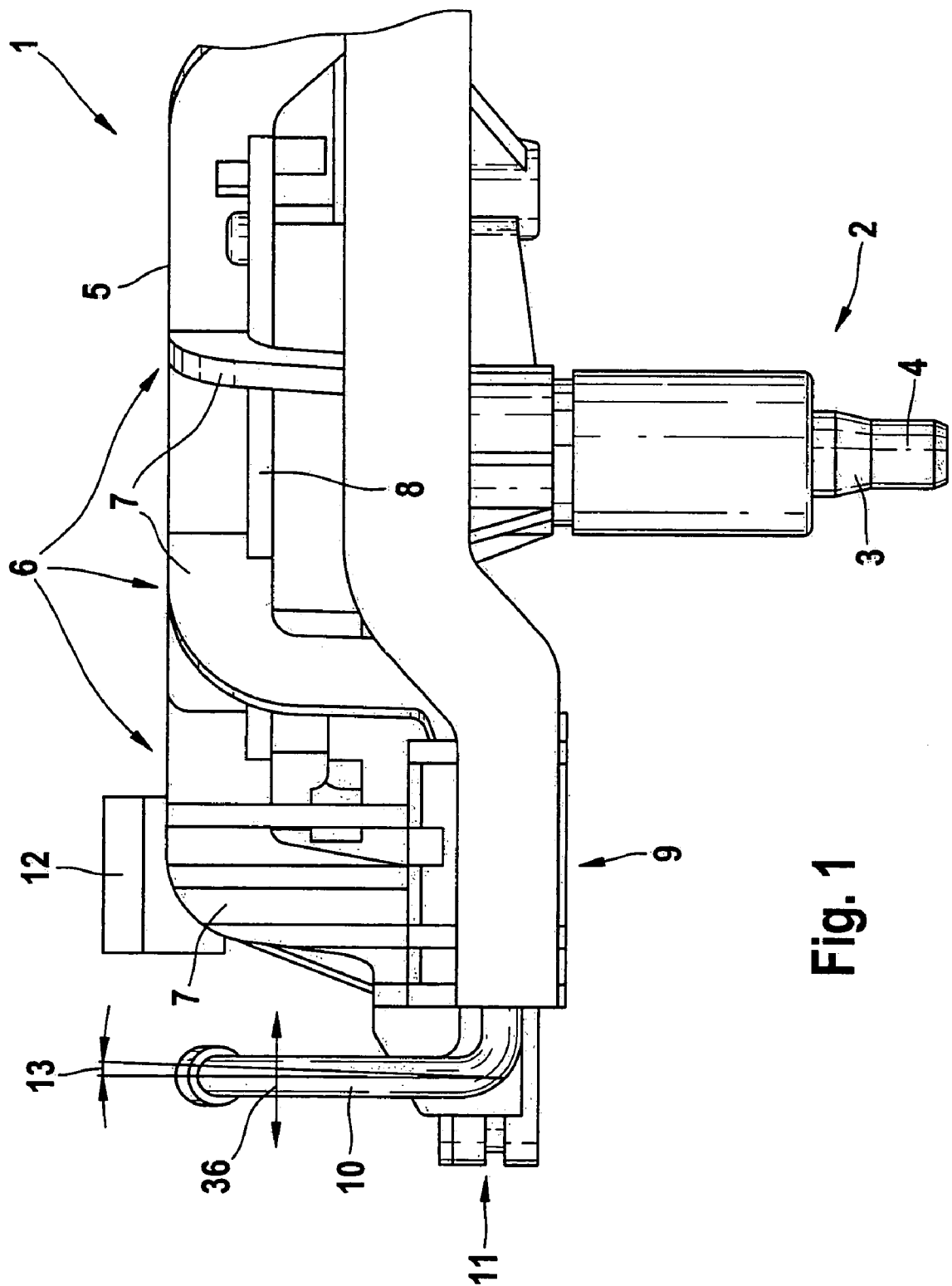

| | | | |
|---|---|---|---|
| 5,979,256 A * | 11/1999 | Kilker et al. | 74/89.16 |
| 5,986,351 A | 11/1999 | Huang et al. | |
| 6,018,223 A * | 1/2000 | Oruganty et al. | 318/10 |
| 6,026,536 A * | 2/2000 | Miller et al. | 15/250.31 |
| 6,075,298 A * | 6/2000 | Maue et al. | 310/12 |
| 6,107,759 A * | 8/2000 | Miller | 318/4 |
| 6,109,672 A * | 8/2000 | Ponziani | 292/223 |
| 6,116,110 A * | 9/2000 | Maue et al. | 74/471 R |
| 6,123,384 A | 9/2000 | Goullieux et al. | |
| 6,792,643 B1 * | 9/2004 | Ponziani | 15/250.31 |
| 2001/0005084 A1 | 6/2001 | Ponziani | |
| 2001/0013226 A1 | 8/2001 | Budde et al. | |
| 2001/0013236 A1 * | 8/2001 | Weyerstall et al. | 70/239 |

* cited by examiner

DEVICE TO ACCOMMODATE A LATCHING ELEMENT ON A WIPER DRIVE

TECHNICAL FIELD

In the case of motor vehicles such as minivans, small buses or even sport utility vehicles, the rear windows can be opened independently of the hatchback when the hatchback is closed. This allows access to the luggage compartment in the rear area of the vehicle if opening and raising the hatchback should not be possible because of confined space conditions. The articulated rear window can be locked in the closed position by means of a latching element on the hatchback. In the case of vehicles with rear window wipers, the rear window wiper drive can be integrated directly into the rear window or into the hatchback.

STATE OF THE ART

With vehicles whose rear windows are provided with a rear window wiper and whose rear windows are movable relative to the hatchback, a locking system is required on the rear window to lock it in its closed position. This locking system is optionally integrated into the central locking system in different vehicle variations. If the wiper support of the rear window wiper is not located on the hatchback, but fastened on the rear window that can be raised relative to the hatchback, a latching system required to lock the hatchback is attached in the form of a lock shackle or the like on a receptacle plate of the wiper drive.

In accordance with previous solutions, the wiper motor driving the rear window wiper, its coupling and the wiper bearing represent a very expensive structural solution. As a result, a change is being made to fasten the wiper motor for the rear window wiper directly on the rear window, which reduces the number of components of a rear window wiper system. Since the receptacle plate accommodating the locking elements of the rear window is eliminated, but the rear window is supposed to remain lockable, new solutions are required.

DESCRIPTION OF THE INVENTION

According to the solution proposed according to the invention, a locking element for the rear window is integrated in the wiper drive containing a wiper motor and a gear allocated to this, thereby eliminating a separate receptacle. A receptacle for a locking element that locks the rear window in its closed position can be integrated into the gear cover, which as a rule is embodied as a plastic injection molded part. A receptacle for a locking element that is integrated into a gear cover or another housing component of the wiper drive unit offers the advantage that a separate, additionally mounted component is not required, thereby simplifying installation and reducing an addition of tolerances on the components that are to be joined together. As a result, the tolerance chain can be shortened considerably.

Because of the integration of the receptacle of a locking element proposed in accordance with the invention into the housing component of the wiper drive, a securing mechanism of the locking element can be created in a simple way. If the receptacle of the locking element is designed as including two cylindrical receptacle bodies, an interruption can be provided on one of the cylinder bodies. This interruption is used to accommodate a securing element, which is accommodated on one of the legs of the locking element. The interruption on one of the cylindrical receptacle bodies to accommodate the locking element is embodied in a slot width, which determines the displaceability of the locking element in its receptacle in an advantageous manner. The displaceability of the locking element is required to compensate for tolerances and to adjust the locking position during installation on the rear window of a vehicle. A securing ring embodied to be springy and featuring an opening on its circumferential surface is preferably used as the securing element, which ring can be captively accommodated on a leg of the locking element.

DRAWINGS

The invention will be described in greater detail on the basis of the drawings. They show:

FIG. 1 A partial representation of a wiper drive that can be mounted on a rear window with a receptacle for a locking element.

Figure 2:
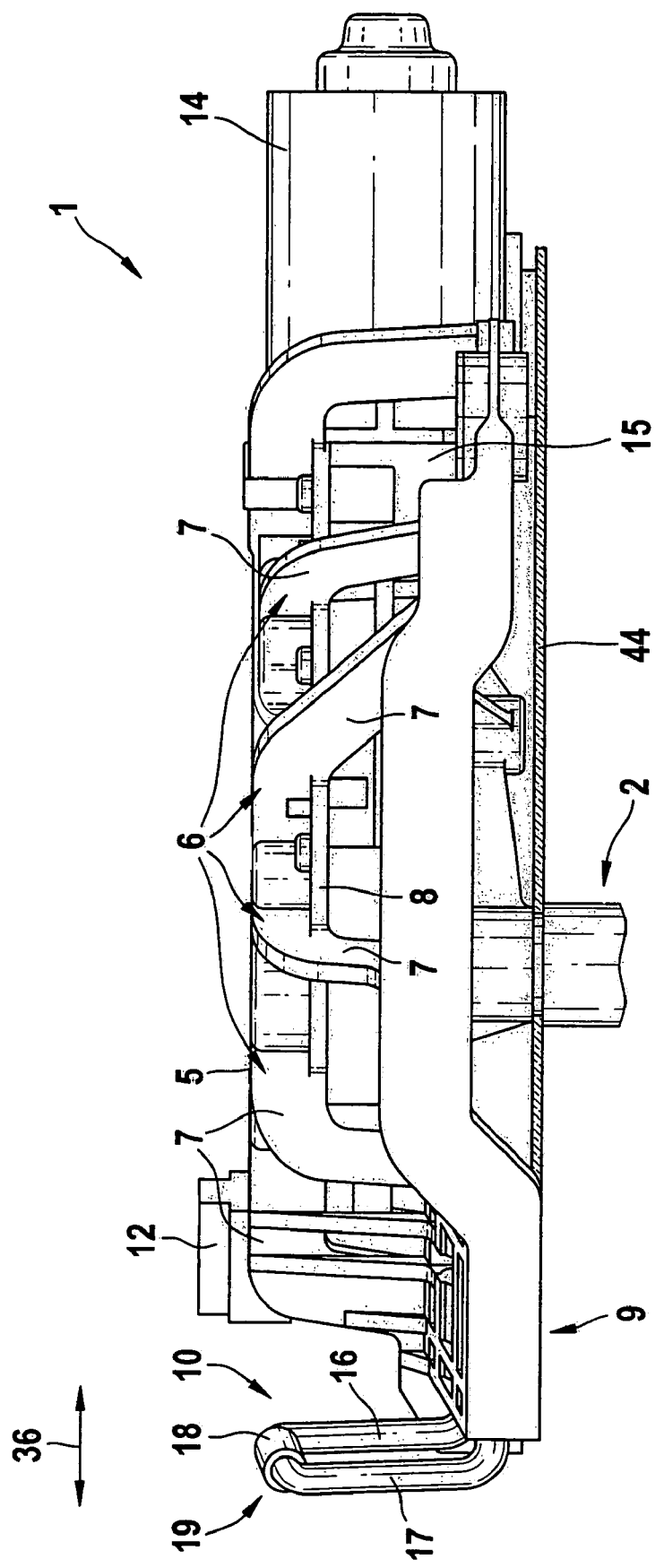

FIG. 2 The wiper drive with a wiper motor and the gear allocated to it.

Figure 3:
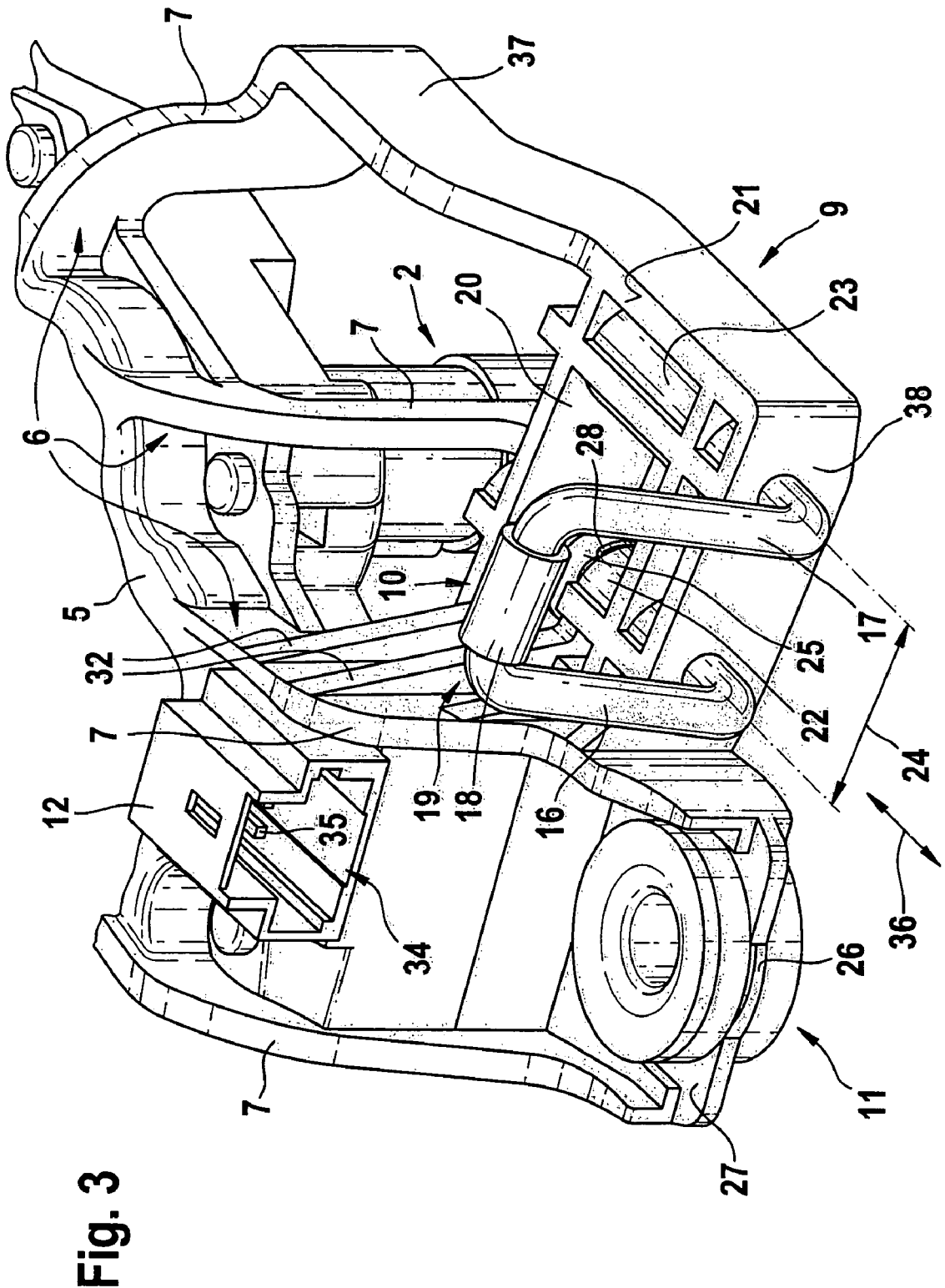

FIG. 3 A perspective top view of the receptacle for the locking element.

Figure 4:
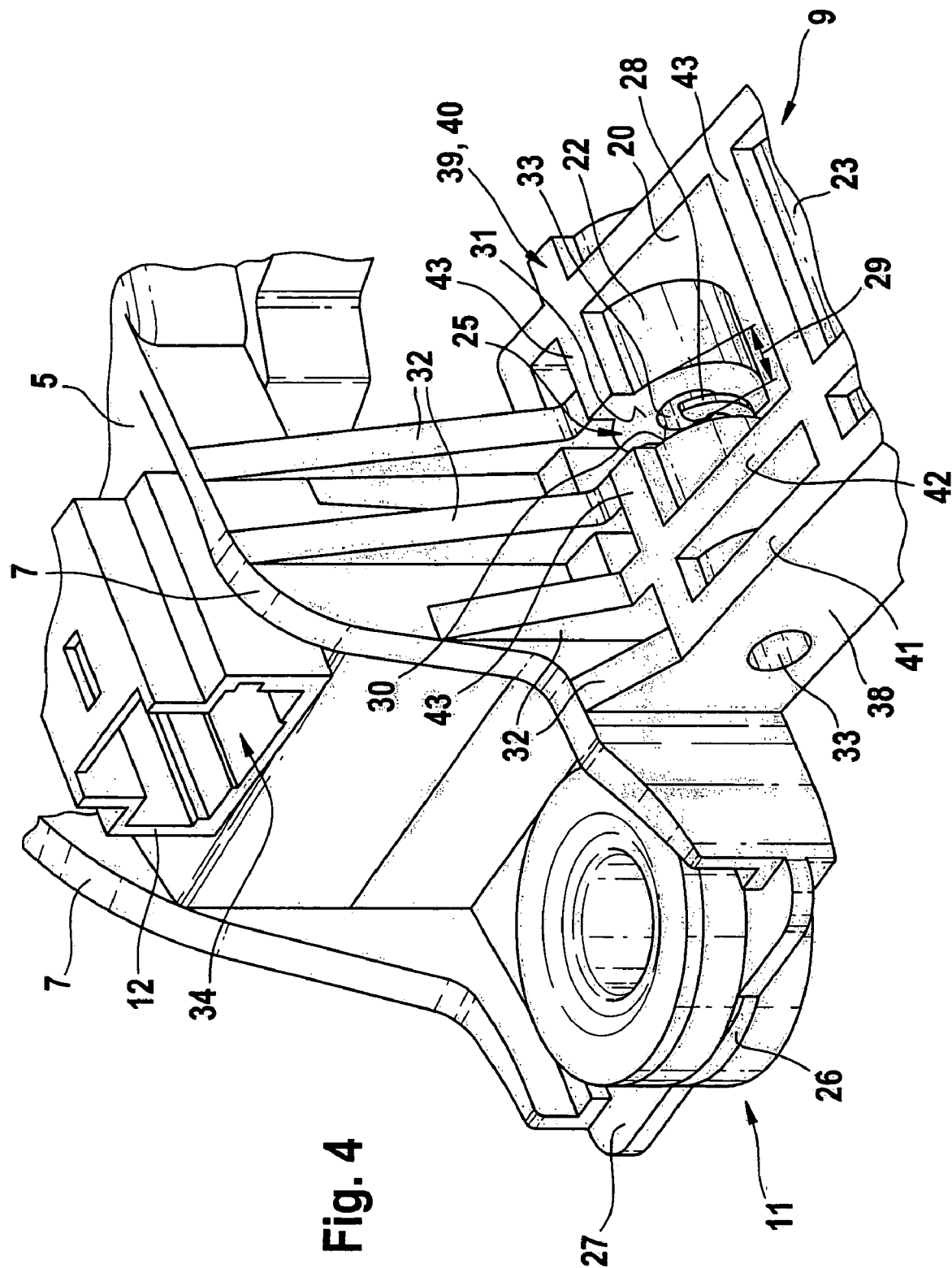

FIG. 4 A view depicted in an enlarged scale of a cylindrical receptacle body for a locking element.

Figure 5:
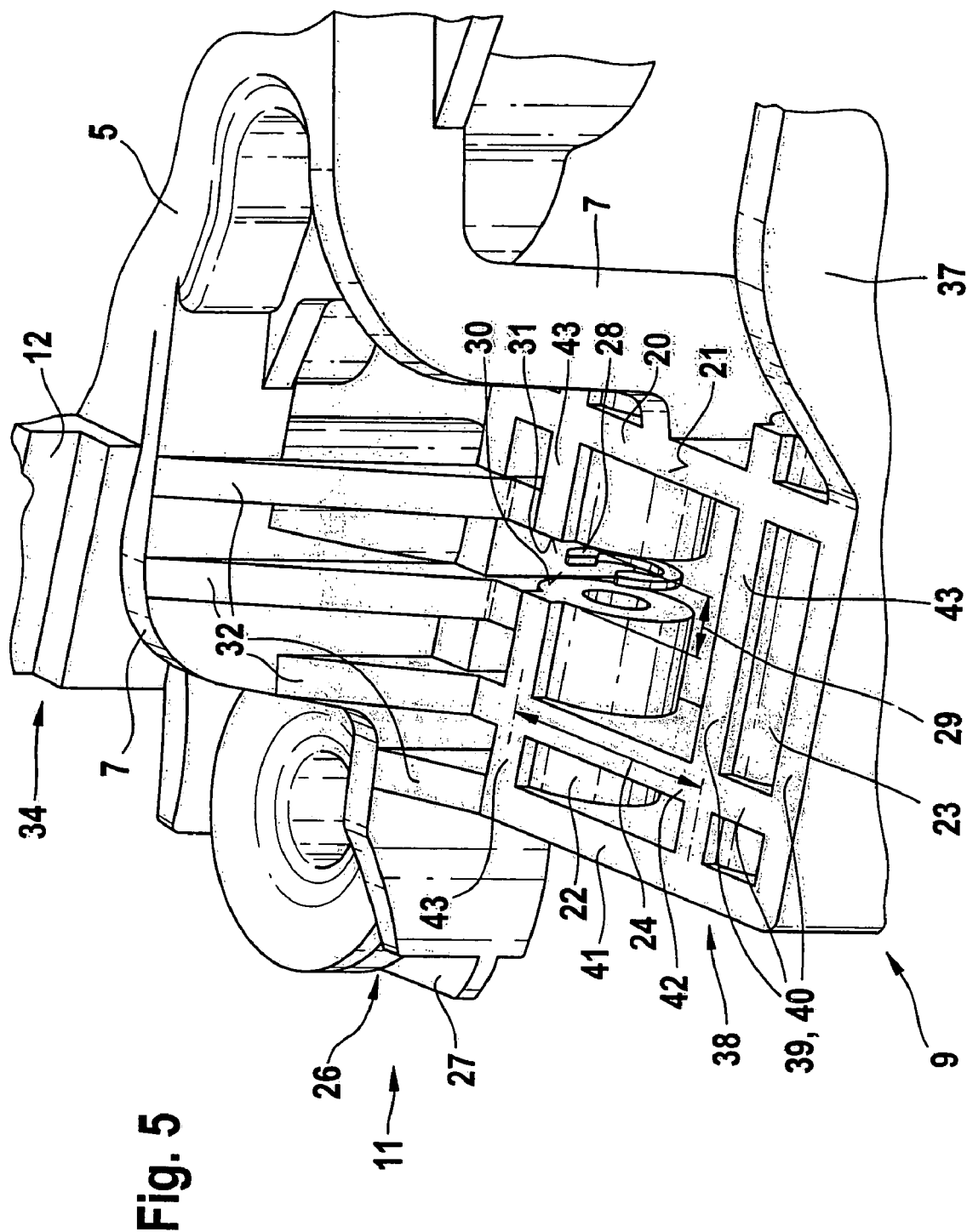

FIG. 5 A perspective top view of two cylindrical receptacle bodies arranged in parallel.

Figure 6:
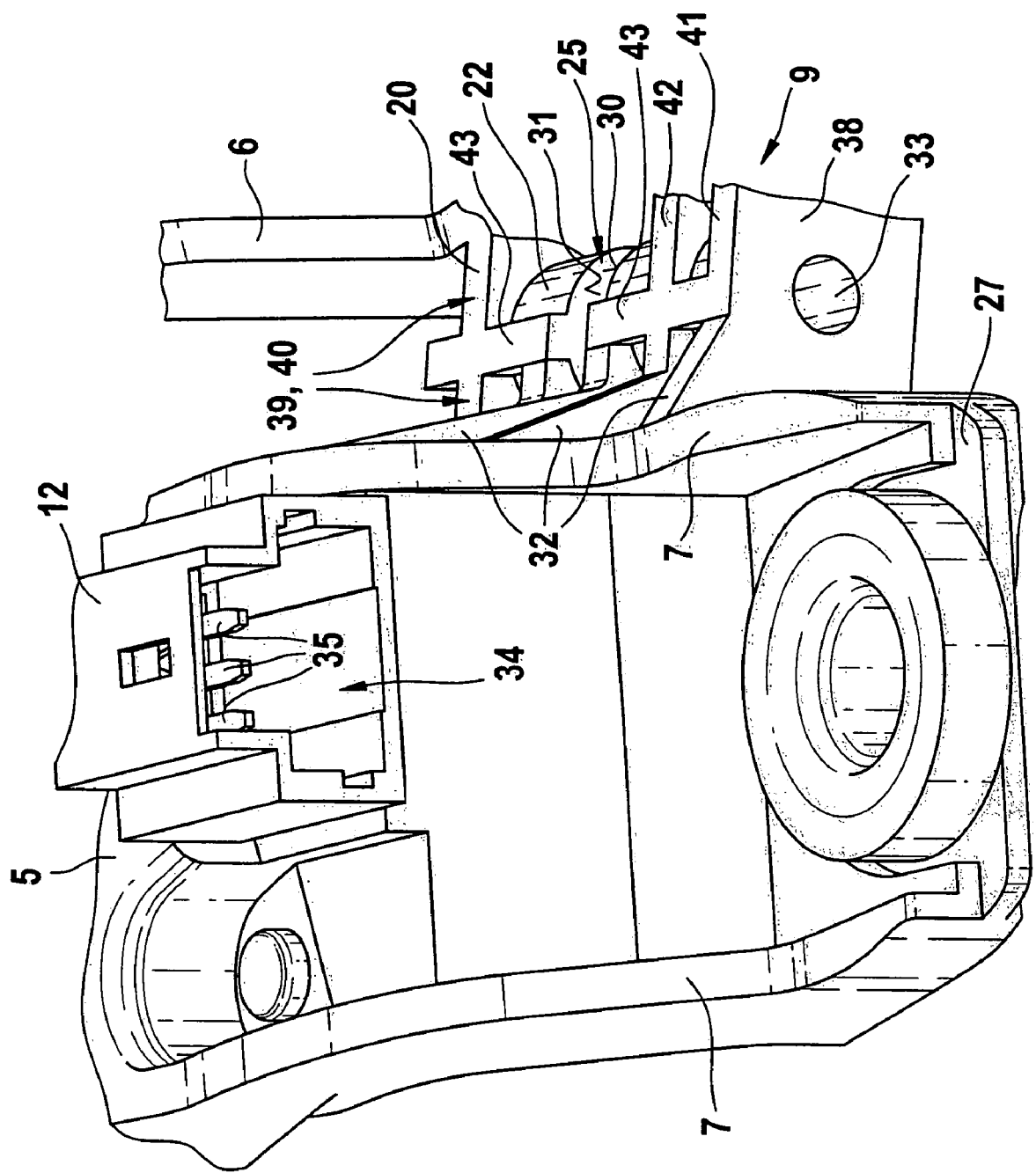

FIG. 6 A view of a plug receptacle embodied on the wiper drive.

EMBODIMENT VARIATIONS

FIG. 1 shows a partial representation of a wiper drive, which can be mounted on an articulated rear window, with a receptacle for a locking element.

A wiper drive 1 shown in FIG. 1 includes a wiper receptacle 2, on which a wiper arm (not shown in FIG. 1) can be fastened. For this purpose, a drive shaft 4 for the wiper arm includes a conically embodied area 3, on which the wiper arm can simply be attached. It is driven by means of the drive shaft 4 for the wiper arm so that it wipes over an approximately semi-circularly configured area of the rear window of a vehicle.

The wiper drive 1 includes a cover part 5, which is provided with a cover part ribbing 6. The cover part ribbing 6 includes radial ribs 7, which extend from a central area of the cover part 5 into its periphery, as well as longitudinal ribs designated by reference number 8. A receptacle 9 for a locking element designated by reference number 10 is arranged laterally on the cover part 5 of the wiper drive 1. The locking element 10 is embodied to be bow-shaped and is accommodated with play 13 in the receptacle 9 integrated in the cover part 5. The hollow spaces (not shown in FIG. 1) within the receptacle 9 that accommodate the legs of the locking element 10 are embodied with slight play with respect to the diameter of the legs of the locking element 10 so that the locking element, whose movement direction is labeled with reference number 36, can execute a slight swiveling movement as indicated by the arrow 13. In addition, a plug receptacle 12 is arranged on the cover part 5 of the wiper drive 1 in the area of a radial rib 7.

FIG. 2 shows a perspective view of the wiper drive with a wiper motor and the gear allocated to it.

Positioned in the cover part 5 of the wiper drive 1 is a wiper arm receptacle 2, which, at an opening, passes through an articulated window surface 44 positioned on a hatchback of a vehicle. According to the depiction in FIG. 2, the conical area reproduced in FIG. 1 is embodied on the wiper arm receptacle 2, on which area a wiper arm can simply be attached. The cover part 5 of the wiper drive 1 is fastened directly on the inside of the window surface 44. The cover part 5 features the cover ribbing 6 depicted in FIG. 1, which includes both radial ribs 7 as well as longitudinal ribs 8. A wiper motor 14 positioned laterally on the cover part 5 drives the wiper arm receptacle 2 via a gear 15 that is allocated to the motor. The wiper motor 14 is preferably embodied as a reversing drive, which reverses the rotational direction after reaching an end position and moves the wiper arm accommodated on the wiper arm receptacle 2 into the opposite end position. In doing so, in general a semi-circular area is wiped on the rear window of a vehicle. The receptacle 9 to accommodate the locking element 10 is located on the other side of the cover part 5 opposite from the receptacle position of the wiper motor 14. The locking element 10 is embodied to be bow-shaped and includes a first leg 16 as well as second leg 17. The first leg 16 and the second leg 17 are connected to one another by a bow 19, which can be enclosed by a casing 18 that can be manufactured of plastic. The double arrow designated by reference number 36 indicates the direction of movement of the bow-shaped embodied locking element 10. The bent embodied leg areas of the first leg 16 or the second leg 17 of the locking element 10 move in both directions corresponding to double arrow 36 in the hollow spaces (not shown in FIG. 2) of the receptacle 9. The plug receptacle 12 (see depiction in FIG. 1) is also in the lower area of the cover part 5 reinforced by a cover ribbing 6, which is preferably embodied as a plastic injection molded component. A connector plug to trigger the wiper motor 14 is inserted into the plug receptacle 12 and locked there. The parked positions of the wiper motor 14 are also transmitted via the connector plug.

FIG. 3 shows a perspective top view of the receptacle for the locking element that is integrated on the cover part.

The cover element 5 that is preferably manufactured as an injection molded component includes the longitudinal ribs 8 depicted in FIGS. 1 and 2 as well as several radial ribs 7. The radial ribs 7 extend in the radial direction related to a central surface area of the cover element 5. A bushing receptacle 11 is provided on the cover part 5. The bushing receptacle 11 includes a seat 27 containing an insert opening 26. A bushing can be inserted laterally though this opening into the bushing receptacle 11, which supports itself on the seat 27.

The bushing receptacle 11 is connected to the cover part 5 via two radial ribs 7 that are essentially arranged parallel to one another. Situated between the two radial ribs 7 is the plug receptacle 12, which delimits an opening 34 in which a plug is inserted. Contact tags 35 are embodied in the interior of the plug receptacle 12, which are contacted via a plug inserted into the opening 34 (not shown in the depiction in FIG. 3).

The receptacle 9 for the control element 10 is depicted laterally on the cover part 5. The receptacle 9 is formed laterally on the cover part 5 and includes a transverse support 38, which turns into a longitudinal support 37, which supports itself on a radial rib 7 of the cover ribbing 6 on the cover part 5. In addition, the receptacle 9 for the locking element is connected to a radial rib 7, which delimits the bushing receptacle 11, via a ribbing that is suggested in FIG. 3 and depicted in more detail in FIG. 4. The receptacle 9, whose upper side is constituted as a plane surface 21, includes a first cylindrical receptacle body 22 and a second cylindrical receptacle body 23. The first cylindrical receptacle body 22 and the second cylindrical receptacle body 23 are essentially arranged parallel to one another. The first cylindrical receptacle body 22 and the second cylindrical receptacle body 23 each include hollow spaces, into which the bent ends of the first leg 16 and the second leg 17 of the bow-shaped embodied locking element 10 are inserted. The first cylindrical receptacle body 22 and the second cylindrical receptacle body 23 are accommodated at a distance 24 from one another.

One of the cylindrical receptacle bodies 22 or 23 (the first cylindrical receptacle body 22 in the depiction in FIG. 3) is provided with an interruption 25. This cylindrical receptacle body is divided into two parts by this interruption 25 on the first cylindrical receptacle body 22 that extends in the axial direction. In the depiction in FIG. 3, the first leg 16 of the locking element 10 penetrates the first cylindrical receptacle body 22. Double arrow 36 indicates the direction of movement of the locking system 10 in the first cylindrical receptacle body 22 and the second cylindrical receptacle body 23.

The first leg 16, which can be inserted into the first cylindrical receptacle body 22 and is provided with an interruption 25 in this case, includes a securing element 28. The securing element 28 can be applied on the circumferential surface of the bent end of the first leg 16. The securing element 28 is preferably embodied as a springy securing ring, which can be accommodated captively on the circumferential surface of the first leg 16 of the bow-shaped configured locking element 10. The first leg 16 and the second leg 17 of the bow-shaped configured locking element 10 are connected to one another via a bow 19, which features an optional plastic casing 18. This is not absolutely required, however.

From the perspective top view according to FIG. 3 of the receptacle 9 for a locking element 10 it follows that the first cylindrical receptacle body 22 and the second cylindrical receptacle body 23 are reinforced by transverse bridges, one of which is designated by reference number 20 in the depiction in FIG. 3. In addition, longitudinal ribs can be embodied on the upper sides of the first cylindrical receptacle body 22 and the second cylindrical receptacle body 23 and these ribs extend parallel to the bent embodied ends of the first leg 16 and the second leg 17 of the bow-shaped embodied locking element 10.

FIG. 4 shows a perspective view in an enlarged scale of a cylindrical receptacle body that has an interruption.

The perspective view in FIG. 4 shows that the receptacle 9 for the locking element 10 (not shown in FIG. 4) is arranged on the cover part 5, which is preferably fabricated as an injection molded component, along with a plug receptacle 12 and a bushing receptacle 11. The plug receptacle 12, whose opening is identified by reference number 34, is depicted lying between two radial ribs 7. The bushing receptacle 11 and its seat 27 containing an insert opening 26 are also delimited by the radial ribs 7 of the cover part 5 that is embodied as a plastic injection molded part.

A ribbing 32 is formed laterally on the cover part 5 on one of the radial ribs 7, which delimit the bushing receptacle 11. According to the depiction in FIG. 4, the ribbing 32 can include several ribs, which are adapted to the progression of the radial ribs 7 and are placed on the upper side of the receptacle for the locking element 10. According to the representation in FIG. 4, the first cylindrical receptacle body 22 featuring the interruption 25 is depicted in an enlarged scale. The interruption 25 is embodied in a slot width designated by reference number 29. Lying apart around the slot width 29 are a first end surface 30 of the area of the first cylindrical receptacle body 22 extending out from the second transverse bridge 42 and a second end surface 31 of the area of the first cylindrical receptacle body 22, which is accommodated on the transverse bridge 20. The first cylindrical receptacle body 22 configured here as two parts and embodied with the interruption 25 includes a hollow space 33, which extends through both partial areas of the first cylindrical receptacle body 22 that is interrupted by the interruption 25. The securing element 28 is situated within this interruption 25 of the first cylindrical receptacle body 22 that is defined by the slot width 29. This securing element is depicted in the representation in FIG. 4 within the interruption 25 and is accommodated on a bent end (not shown here) of the first leg 16 of the locking element 10 (see depiction in FIG. 3).

The second cylindrical receptacle body 23, which is not depicted or only partially depicted in the representation in FIG. 4, is arranged parallel to the first cylindrical receptacle body 22. Transverse bridges 41, 42 and 20 are embodied between the first cylindrical receptacle body 22 and the second cylindrical receptacle body 23, and these bridges reinforce the receptacle 9 for the locking element 10. The upper sides of the transverse bridges 41, 42, and 20 are embodied as plane surfaces 39 and are a part of the plane surface 21 of the upper side of the receptacle 9 for the locking element 10. The upper sides 40 of the transverse bridges 41, 42, and 20 are designated by reference number 40 and are also a part of the upper side embodied as plane surface 21 of the receptacle 9 for the locking element 10. The depiction in FIG. 4 also shows that an axial ribbing 43 extending in the axial direction relative to the hollow space 33 of the first cylindrical receptacle body 22 is embodied on the upper side of the first cylindrical receptacle body 22. The upper plane surface of the axial ribbing 43 also lies in the plane surface 21 on the upper sides of the receptacle 9.

FIG. 5 is a perspective top view of two cylindrical receptacle bodies arranged parallel to one another in the area of the receptacle for a locking element.

The depiction in FIG. 5 shows that the receptacle 9 for a locking element 10 is connected to the cover part 5, one the one hand, via a ribbing 32 comprising several ribs in the area of radial rib 7 and is connected to the cover part 5, on the other hand, via a longitudinal support 37 by means of radial rib 7 that is not shown in FIG. 5 (see depiction in FIG. 3). In addition, extending between the side surfaces of the radial rib 7 accommodating the ribbing 32 and the longitudinal support 37 is another radial rib 7, which connects the receptacle 9 to accommodate the locking element to the cover part 5 that can be manufactured preferably as a plastic injection molded part. The receptacle 9 includes a first transverse bridge 41 as well as second transverse bridge 42 and a transverse bridge 20 in the rear area of the receptacle 9 as viewed in the insertion direction of the locking element 10.

The receptacle 9 to accommodate a locking element 10 is reinforced considerably by the transverse bridges 41, 42, and 20 extending between the first cylindrical receptacle body 22 and the second cylindrical receptacle body 23. Moreover, the longitudinal ribbings 43 extending in the axial direction and embodied on the upper side of the circumferential surfaces of the cylindrical receptacle bodies 22 and 23 contribute to reinforcing the receptacle 9. All bridge surfaces 40 as well as the surfaces of the first transverse bridge 41, of the second transverse bridge 42, of the transverse bridge 20, of the longitudinal ribbing 43 as well as the upper side of the longitudinal support 37, which supports the receptacle 9 on the cover part 5, are constituted as plane surfaces and form a continuous, even, plane upper side 21 of the receptacle 9. Reference number 24 identifies the distance between the first cylindrical receptacle body 22 and the second cylindrical receptacle body 23.

The first end surface 30 and the second end surface 31, which delimit the interruption 25 on the first cylindrical receptacle body 22, are depicted in the perspective view in FIG. 5 of the receptacle for the locking element. The interruption 25 is embodied in a slot width 29. A securing element 28, which can be embodied captively as a securing ring accommodated on a bent first leg of the locking element 10, is drawn in the slot width in the area between the first end surface 30 and the second end surface 31 on the first cylindrical receptacle body 22. An installation clearance or an installation tolerance is defined by the slot width 29, i.e., the distance between the first end surface 30 and the second end surface 31 of the areas of the first cylindrical receptacle body 22. This is the tolerance with which the locking element (not shown in FIG. 5) is movable with its bent ends of the first leg 16 and the second leg 17 within its receptacle 9 integrated into the cover part 5. Component tolerances can be compensated.

In addition, the parts of the plug receptacle 12 with an opening 34 embodied on it to accommodate a connector plug are depicted in FIG. 5 as well as a bushing receptacle 11, which is delimited by radial ribs 7 of the cover ribbing of the cover part 5, in whose seat 27 an insert opening 26 is embodied.

The depiction in FIG. 6 shows a view of a first cylindrical receptacle body within a receptacle for a locking element.

Two radial ribs 7 that are essentially arranged parallel to one another extend from the cover part 5 of a wiper drive embodied preferably as a plastic injection molded part. These delimit the seat 27, which is used to accommodate a bushing component that is used for uncoupling the wiper motor 14 from the rear window.

A plug receptacle 12 is injection molded onto the cover part 5, in whose opening 34 a plug connector can be locked. The connector that is not shown in FIG. 6 makes contact with contact tags 35 that are arranged on the inside of the plug receptacle 12.

In addition, FIG. 6 shows the first cylindrical receptacle body 22 provided with an interruption 25. A hollow space 33 fills the cylindrical receptacle body 22. The opening of the hollow space 33, into which a first leg 16 of the bow-shaped embodied locking element 10 can be inserted, is embodied in the transverse support 38 of the receptacle 9 for the locking element 10. Parts of the first transverse bridge 41 and the second transverse bridge 42 as well as the transverse bridge 20 can be seen in FIG. 6; these bridges reinforce the two cylindrical receptacle bodies 22 and 23 in the transverse direction. The interruption (designated by reference number 25) of the first cylindrical receptacle body 22 is delimited by the first end surface 30 and the second end surface 31. The first cylindrical receptacle body 22 also features a longitudinal ribbing 43 extending in the axial direction on the upper side of its surface shell. All bridge surfaces 40 of the transverse bridges 20, 41, and 42 or of the axial ribbing 43 extending in the axial direction are embodied as plane surfaces 39. As suggested in FIG. 6, the receptacle 9 for a locking element 10 is reinforced via a ribbing 32 injection molded onto the radial ribs 7 and this ribbing can include the individual ribs that can be formed in different geometries.

The cover part 5 of the wiper drive 1 that is depicted in FIG. 6 in accordance with the depictions in FIGS. 1 and 2 is preferably manufactured as a plastic injected molded component. When manufacturing the cover part 5, the receptacle 9 for the locking element 10 can be formed on in an advantageous manner and provided with the corresponding ribbings 43 extending in the longitudinal direction as well as the transverse bridges 20, 41 and 42 extending in the transverse direction. The ribbing 32 is injection molded directly onto the radial rib 7 when manufacturing or forming the receptacle 9 for the locking element 10. Even the interruption 25 in a specified slot width 29 corresponding to the desired tolerances or the free travel can be directly prescribed when manufacturing the cover part 5 of the wiper drive 1, which is embodied as an injection molded component. Any refinishing work that might be required would be related only to processing the plane surface 20 on the upper side of the receptacle 9. Even the hollow spaces 33 embodied in the first and the second cylindrical receptacle body 22 and 23 no longer require reprocessing.

LIST OF REFERENCE NUMBERS

1 Wiper drive
2 Wiper arm receptacle
3 Conical area
4 Drive shaft, wiper arm
5 Cover part
6 Cover ribbing
7 Radial rib
8 Longitudinal rib
9 Receptacle for locking element
10 Locking element
11 Bushing receptacle
12 Plug receptacle
13 Play, locking element
14 Wiper motor
15 Gear
16 First leg, locking element
17 Second leg, locking element
18 Casing
19 Bow section
20 Transverse bridge
21 Plane surface
22 First cylindrical receptacle body
23 Second cylindrical receptacle body
24 Distance
25 Interruption
26 Insert opening
27 Seat, bushing receptacle
28 Securing element
29 Slot width
30 First end surface
31 Second end surface
32 Ribbing, receptacle 9
33 Hollow space
34 Plug opening
35 Contact tags
36 Movement direction, locking element
37 Longitudinal support
38 Transverse support
39 Plane surface
40 Upper sides of the bridge
41 First transverse bridge
42 Second transverse bridge
43 Axial ribbing, receptacle body
44 Window surface

What is claimed is:

1. Wiper drive with a wiper arm receptacle (2) for mounting on an articulated window surface (44) of a vehicle that can be locked by means of a locking element (10), whereby the wiper drive (1) includes a cover part (5), in which a wiper motor (14) and a gear (15) allocated to the motor are accommodated, characterized in that a receptacle (9; 22; 23) for the locking element (10; 16, 17) is integrated into the cover part (5), on which a securing element (28) arranged between the surfaces (30, 31) of the receptacle (9; 22, 23) is accommodated.

2. Wiper drive according to claim 1, characterized in that the receptacle (9; 22, 23) for the locking element (10) is connected with the cover part (5) via a longitudinal support (37) and a transverse support (38).

3. Apparatus according to claim 2, characterized in that the receptacle (9; 22, 23) integrated into the cover part (5) features reinforcing transverse bridges (20, 40, 41) in the transverse direction.

4. Wiper drive according to claim 1, wherein the cover part has a cover ribbing, characterized in that the receptacle (9; 22, 23) is connected via a ribbing (32) with a radial rib (7) of the cover ribbing (6) of the cover part (5).

5. Wiper drive according to claim 1, characterized in that the receptacle (9) includes a first cylindrical receptacle body (22) and a second cylindrical receptacle body (23).

6. Wiper rive according to claim 5, characterized in that the first cylindrical receptacle body (22) and the second cylindrical receptacle body (23) are arranged parallel to one another.

7. Apparatus according to claim 5, characterized in that one of the cylindrical receptacle bodies (22, 23) features an interruption (25), which is delimited by a first end surface (30) and a second end surface (31) of the respective cylindrical receptacle body (22, 23).

8. Apparatus according to claim 7, characterized in that the interruption (25) is embodied on one of the cylindrical receptacle bodies (22, 23) in an installation clearance and a slot width (29) that facilitates a compensation of component tolerances.

9. Apparatus according to claim 5, characterized in that the first cylindrical receptacle body (22) and the second cylindrical receptacle body (23) each feature a hollow space (33) to accommodate the locking element (10).

10. Apparatus according to claim 5, characterized in that the cylindrical receptacle bodies (22, 23) of the receptacle (9) for the locking element (10) are reinforced in the transverse direction by transverse bridges (20, 41, 42) and in the longitudinal direction by axial ribbing (43).

11. Apparatus according to claim 1, characterized in that the locking element (10) is embodied to be bow-like and includes a first leg (16) as well as a second leg (17).

12. Apparatus according to claim 11, wherein the receptacle (9) includes a first cylindrical receptacle body (22) and a second cylindrical receptacle body (23), wherein one of the cylindrical receptacle bodies has an interruption (25), and wherein one of the legs of the locking element penetrates said one of the cylindrical receptacle bodies, characterized in that the securing element (28) is applied to said one of the legs of the locking element.

13. Apparatus according to claim 1, characterized in that the securing element (28) is embodied as a springy securing ring.

14. Apparatus according to claim 1 characterized in that the upper side of the receptacle (9; 22, 23) is embodied as a plane surface (21, 39).

15. Apparatus according to claim 1, wherein the integrated receptacle (9; 22, 23) is a plastic injection molded part.

* * * * *